(12) United States Patent
Wang et al.

(10) Patent No.: US 8,879,656 B2
(45) Date of Patent: Nov. 4, 2014

(54) COOPERATIVE MIMO SYSTEM BASED ON PARTIAL ZADOFF-CHU SEQUENCE AND SYNCHRONIZATION METHOD THEREOF

(75) Inventors: Chin-Liang Wang, Hsinchu (TW);
Hung-Chin Wang, Hsinchu (TW);
Ying-Yi Chen, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 171 days.

(21) Appl. No.: 13/538,186

(22) Filed: Jun. 29, 2012

(65) Prior Publication Data
US 2013/0195212 A1 Aug. 1, 2013

(30) Foreign Application Priority Data
Jan. 31, 2012 (TW) .............................. 101103168 A (51) Int. Cl.
*H04B 7/02* (2006.01)

(52) U.S. Cl.
USPC .............................. 375/267; 375/260; 455/91

(58) Field of Classification Search
USPC ................................................ 375/260, 146
See application file for complete search history.

(56) References Cited

U.S. PATENT DOCUMENTS

| | | | | |
|---|---|---|---|---|
| 2007/0230600 A1* | 10/2007 | Bertrand et al. | ............... | 375/260 |
| 2009/0325513 A1* | 12/2009 | Iwai et al. | ........................ | 455/91 |
| 2010/0311428 A1* | 12/2010 | Zhang et al. | .................. | 455/447 |

OTHER PUBLICATIONS

Guo, F. et al. "A Novel Timing Synchronization Method for Distributed MIMO-OFDM System" *Institute of Electrical and Electronics Engineers*, 2006, 1933-1936.
van de Beek, J. et al. "A Time and Frequency Synchronization Scheme for Multiuser OFDM" *IEEE Journal on Selected Areas in Communications*, Nov. 1999, 17(2):1900-1914.

* cited by examiner

*Primary Examiner* — Eva Puente
(74) *Attorney, Agent, or Firm* — Saliwanchik, Lloyd & Eisenschenk (57) ABSTRACT

A cooperative multiple-input multiple-output system based on partial Zadoff-Chu sequences and a synchronization method thereof are disclosed, and the system comprises a plurality of transmitters and a receiver. Each transmitter's training signal is disposed in a subband having a length of V, and the training signal is converted into a time domain signal. The receiver receives the time domain signals of the cooperating transmitters. Each transmitter extracts V successive samples from any region of a Zadoff-Chu sequence having a length equal to a multiple of V and the samples are disposed in an exclusive subband as the training signal. When the training signals of cooperating transmitters are converted into time and frequency domain signals, the training signals of all the transmitters are separated from each other to suppress mutual interference in both time and frequency domains and to improve the performance of synchronization.

10 Claims, 9 Drawing Sheets

$$Z(k) = e^{-j\frac{\pi k^2}{\beta V}}$$

A partial Zadoff-Chu sequence in the frequency domain $\beta=5, V=256, N=1024$ The corresponding training signal in the time domain $\beta=5, V=256, N=1024$

COOPERATIVE MIMO SYSTEM BASED ON PARTIAL ZADOFF-CHU SEQUENCE AND SYNCHRONIZATION METHOD THEREOF

CROSS-REFERENCE TO RELATED APPLICATION

This application claims the benefit under 35 U.S.C. §119 of Taiwan Patent Application No. 101103168, filed on Jan. 31, 2012, which is hereby incorporated by reference in its entirety.

BACKGROUND

1. Field of the Invention

The present invention relates to a cooperative multiple-input multiple-output (MIMO) system based on a partial Zadoff-Chu sequence, more particularly to the cooperative MIMO system and a synchronization method thereof capable of improving the synchronization performance effectively based on a partial Zadoff-Chu sequence.

2. Description of Related Art

In the past two decades, orthogonal frequency division multiplexing (OFDM) technology has become the core of different wireless communication systems, and multiple-input multiple-output (MIMO) technology has been proven effective on improving the capacity and performance of the systems. Therefore, the wireless orthogonal frequency division multiplexing system integrated with the MIMO technology is believed to be a mainstream wireless wideband communication system.

MIMO systems can be implemented in a centralized, cooperative or distributed manner, but MIMO systems are limited by hardware and cost, so that the centralized MIMO system having a plurality of antennas installed thereon has lots of limitations. On the other hand, the cooperative MIMO system comes with different transmission delays, and signals from different distributed cooperative nodes will arrive at the receiver at different timing, and have different carrier frequency offsets (CFOs). Therefore, the cooperative MIMO system has a higher level of difficulty to achieve the synchronization.

As disclosed by J.-J. van de Beek, P. Borjesson, M.-L. Boucheret, D. Landstrom, J. Arenas, P. Odling, C. Ostberg, M. Wahlqvist, and S. Wilson in "A time and frequency synchronization scheme for multiuser OFDM," IEEE J. Sel. Areas Commun., vol. 17, no. 11, pp. 1900-1914, November 1999, a synchronization method uses different subbands to carry the training data of different transmitters, such that the signals transmitted from different transmitters can be separated in frequency domain, and a band-pass filter restores data transmitted from each transmitter. However, this method requires an additional band-pass filter for each user, thus incurring a higher cost of the system.

As disclosed by F. Guo, D. Li, H. Yang, and L. Cai in "A novel timing synchronization method for distributed MIMO-OFDM system," in Proc. 2006 IEEE Veh. Technol. Conf.—Spring (VTC 2006-Spring), vol. 4, Melbourne, Australia, May 2006, pp. 1933-1936. Different cycle training sequences are provided for different transmitters, and a receiver identifies different cycle training sequences to distinguish signals transmitted from different transmitters. Although each transmitter has a different cycle training sequence, yet this method still will make the receiver to process a mixed training signal in both the time domain and the frequency domain. As the quantity of transmitters increases, the interference among training signals will become increasingly more serious.

Therefore, it is a main subject for the present invention to provide a cooperative orthogonal frequency division multiplexing system with the capability of effectively separating the training sequences of the transmitters in both time domain and frequency domain to enhance the performance of the system synchronization without requiring any band-pass filter.

BRIEF SUMMARY

In view of the shortcomings of the prior art, it is a primary objective of the present invention to overcome the aforementioned drawbacks of the prior art by providing a cooperative MIMO system based on a partial Zadoff-Chu sequence and a synchronization method thereof.

To achieve the aforementioned objective, the present invention provides a cooperative MIMO system based on a partial Zadoff-Chu sequence, comprising a plurality of transmitters and a receiver. The multiple transmitters are located at various locations and training signals are put in exclusive subbands having a length of V, and the training signals are converted into the time domain signals. The receiver is provided for receiving the time domain signal. Wherein, each transmitter obtains V successive samples in any region of a Zadoff-Chu sequence having a length equal to a multiple of V and puts the samples in exclusive subbands as frequency-domain training signals, so that when the training signals of each transmitter is converted into time domain, they can also be separated from the training signals of another transmitter to reduce mutual interference at the receiver to improve the performance of the system synchronization.

Another objective of the present invention is to provide a synchronization method of a cooperative MIMO system, and the synchronization method comprises the steps of: using a plurality of transmitters located at various locations to dispose training signals in exclusive subbands having a length equal to V, and converting the training signal into the time domain signals; using the transmitters to obtain V successive samples of any region from a Zadoff-Chu sequence having a length equal to a multiple of V, and disposing the samples in the exclusive subbands and using the samples as the training signals, such that when the training signal of each transmitter is converted into the time domain signals and the frequency domain signal, the signals can be separated; receiving the time domain signal through a receiver.

Preferably, each transmitter uses the Zadoff-Chu sequence having a length equal to a multiple of V and disposes the first V samples as the training signals in an exclusive subband.

Preferably, the partial Zadoff-Chu sequence Z(k) satisfies the relation of:

$$Z(k) = e^{-j\frac{\pi k^2}{\beta V}}$$

wherein, k=0,1, ..., V−1, $\beta$ is a natural number greater than 1, k is a subcarrier index, and V is the length of the exclusive subband.

Preferably, a correlation window is utilized to compensate a carrier frequency offset and to reduce computational complexity. The correlation window P satisfies a relation of:

$$P = \lfloor 2\sqrt{2\pi/(\beta V)} N \rfloor$$

wherein, $\beta$ is a natural number greater than 1, V is the length of the exclusive subband, and N is a fast Fourier transform (FFT) size. Preferably, the training signal Z(k) satisfies the following relation:

$$Z(k) = \begin{cases} e^{\frac{-jM\pi k^2}{N}}, & N \text{ is even} \\ e^{\frac{-jM\pi k(k+1)}{N}}, & N \text{ is odd} \end{cases}$$

$$k = v, v+1, \ldots, v+V-1$$

$$v \in [0, N-V]$$

wherein, M is an integer relatively prime to N, V is the length of the exclusive subband, and N is larger than V.

In summation, the cooperative MIMO system based on a partial Zadoff-Chu sequence and the synchronization method of the present invention have one or more of the following advantages:

(1) The cooperative MIMO system based on a partial Zadoff-Chu sequence and the synchronization method thereof in accordance with the present invention requires no band-pass filter for training signal separation, and thus can lower the cost of the system significantly.

(2) The cooperative MIMO system based on a partial Zadoff-Chu sequence and the synchronization method thereof in accordance with the present invention can effectively separate the training signals in both the time domain and the frequency domain at the receiver, and thus can improve the synchronization performance of the system significantly.

(3) The cooperative MIMO system based on a partial Zadoff-Chu sequence and the synchronization method thereof in accordance with the present invention can not only compensate multiple carrier frequency offsets in time domain but also reduce the computational complexity of the system significantly by a special design of the correlation window.

DETAILED DESCRIPTION

The technical characteristics of the present invention will become apparent with the detailed description of the preferred embodiments accompanied with the illustration of related drawings as follows. It is noteworthy to point out that same numerals are used for representing the same respective elements in the drawings.

Figure 1:
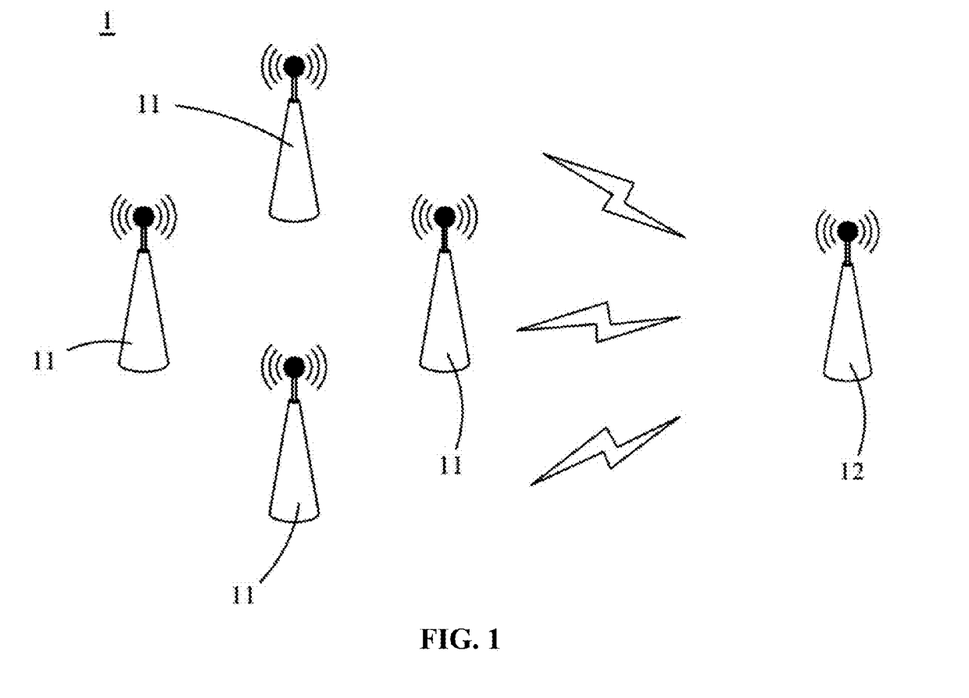
FIGS. 1 and 2 are schematic views of a cooperative MIMO system and a partial Zadoff-Chu sequence of the present invention, respectively.
Figure 2:
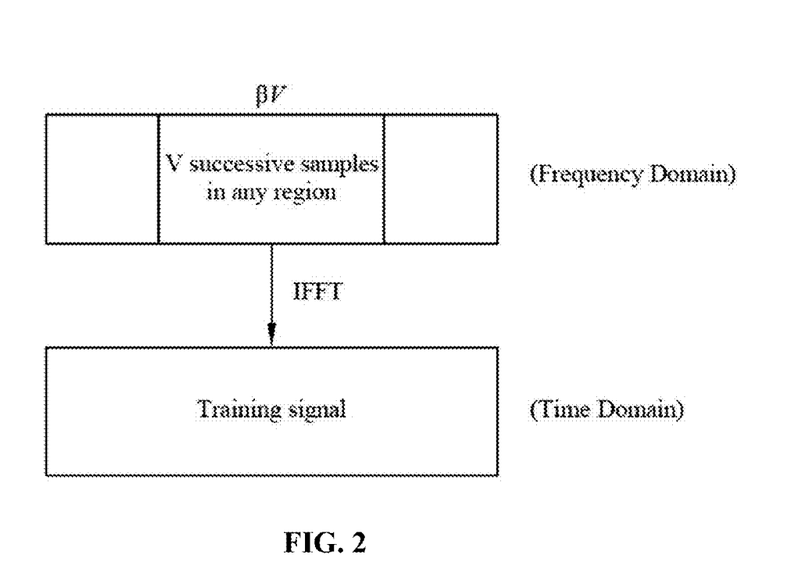

With reference to FIGS. 1 and 2 for schematic views of a cooperative MIMO system based on a partial Zadoff-Chu sequence of the present invention, the cooperative MIMO system 1 comprises a plurality of transmitters 11 and a receiver 12 as shown in FIG. 1.

The cooperative MIMO system 1 of the present invention comprises a plurality of transmitters 11 disposed at various locations, and uses exclusive subbands having a length equal to V to dispose training signals, such that the signal transmitted by each transmitter can be separated in both the frequency domain and the time domain. After each transmitter processes the training signal, an inverse fast Fourier transform (IFFT) is used to convert the training signal into time domain data to be transmitted to the receiver 12. The receiver 12 receives the time domain signal.

With reference to FIG. 2 for the design of a training signal of the transmitter 11, the transmitter 11 can dispose V successive samples of any region in a Zadoff-Chu sequence having a length equal to a multiple of V in exclusive subbands and use the samples as training signals. With the selection of different multiples, the Zadoff-Chu sequences transmitted by each transmitter 11 can be separated in both the frequency domain and the time domain. Therefore, the training signals transmitted from each transmitter 11 to the receiver 12 will not interfere with one another, and the performance of system synchronization can be improved. Besides the use of partial Zadoff-Chu sequences, the present invention also can use a complete Gaussian sequence.

It is noteworthy that the method of the present invention using a partial Zadoff-Chu sequence as the training signal of the transmitter requires no band-pass filter for training signal separation at the receiver, and thus can reduce the cost of the system significantly. On the other hand, the present invention can effectively separate the training signals transmitted from each transmitter in the time domain and the frequency domain, and thus the invention can improve the performance of system synchronization.

Figure 3:
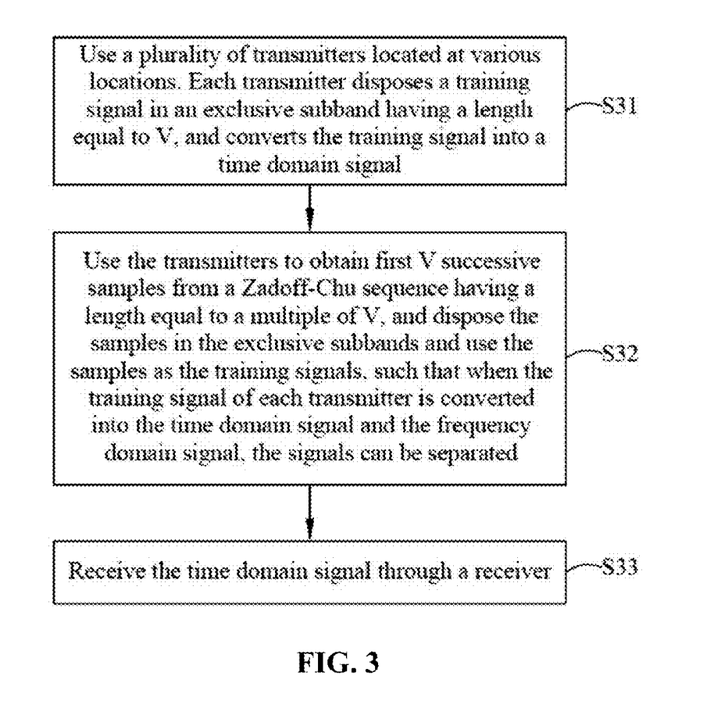
FIG. 3 is a flow chart of an operation of a cooperative MIMO system based on a partial Zadoff-Chu sequence in accordance with a first preferred embodiment of the present invention.

With reference to FIG. 3 for a flow chart of an operation of a cooperative MIMO system based on a partial Zadoff-Chu sequence in accordance with a first preferred embodiment of the present invention, each transmitter of the cooperative MIMO system uses an exclusive subband having a length equal to V to dispose a training signal, and uses a Zadoff-Chu sequence having a length equal to several times of V to obtain the first V samples disposed in the exclusive subband as a training signal. The training signal is comprised of a partial Zadoff-Chu sequence and satisfies the following relation:

$$Z(k) = e^{-j\frac{\pi k^2}{\beta V}}$$

wherein, k=0,1, . . . , V−1, β=1 with respect to a complete Zadoff-Chu sequence having a length equal to V, wherein β is a natural number greater than 1, and V is the length of the exclusive subband. In general, the partial Zadoff-Chu sequence can be the following form:

$$Z(k) = \begin{cases} e^{\frac{-jM\pi k^2}{N}}, & N \text{ is even} \\ e^{\frac{-jM\pi k(k+1)}{N}}, & N \text{ is odd} \end{cases}$$

$$k = v, v+1, \ldots, v+V-1$$

$$v \in [0, N-V]$$

wherein, M is an integer relatively prime to N, V is the length of the exclusive subband, and N is larger than V. Compared with the training signal generated by the complete Zadoff-Chu sequence, the training signals generated by the partial Zadoff-Chu sequence are more concentrated in time domain, so as to effectively separate the training signals transmitted from different transmitters on the time domain. The method of this preferred embodiment comprises the following steps:

S31: Use a plurality of transmitters located at various locations. Each transmitter disposes a training signal in an exclusive subband having a length equal to V, and converts the training signals into the time domain signals.

S32: Use the transmitters to obtain first V successive samples from a Zadoff-Chu sequence having a length equal to a multiple of V, and dispose the samples in the exclusive subbands and use the samples as the training signals, such that when the training signal of each transmitter is converted into the time domain signal and the frequency domain signal, the signals can be separated.

S33: Receive the time domain signal through a receiver.

Figure 4:
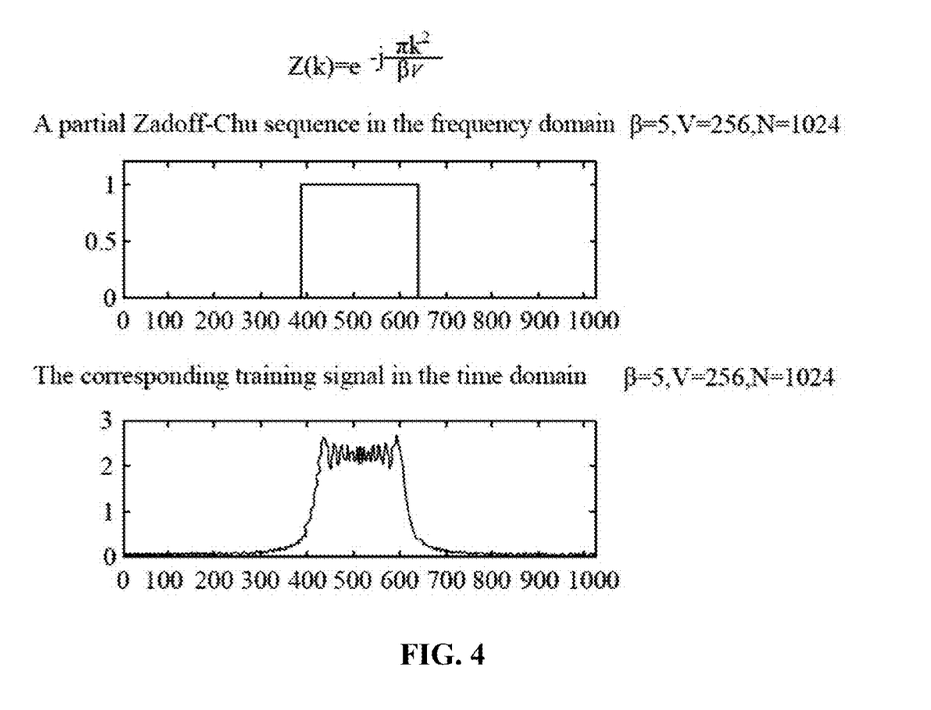
FIG. 4 is a schematic view of a cooperative MIMO system based on a partial Zadoff-Chu sequence in accordance with a second preferred embodiment of the present invention.

With reference to FIG. 4 for a schematic view of a cooperative MIMO system based on a partial Zadoff-Chu sequence in accordance with the second preferred embodiment of the present invention, a partial Zadoff-Chu sequence is used, wherein, β is 5, the length of the exclusive subband (V) is 256 and the Fourier transform size (N) is 1024. In addition, when the value of β is increased, the corresponding training signal will be more concentrated in the time domain.

On the other hand, when the value of β is increased, the cooperative MIMO system can use a smaller correlation window to compensate the carrier frequency offset (CFO) and to effectively reduce the computational complexity of the system. Wherein, the correlation window satisfies the relation of:

$$P = \lfloor 2\sqrt{2\pi}/(\beta V)N \rfloor$$

wherein, β is a natural number greater than 1, V is the length of the exclusive subband, and N is a fast Fourier transform (FFT) size.

Figure 5:
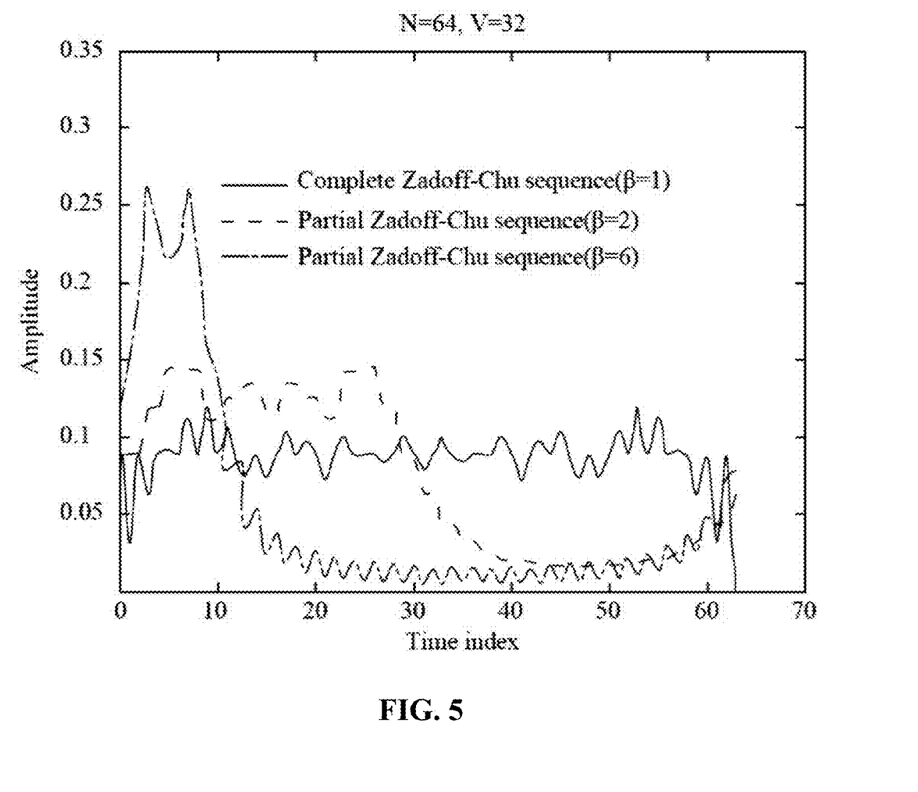
FIGS. 5 to 7 is a schematic view of a cooperative MIMO system based on a partial Zadoff-Chu sequence in accordance with a third preferred embodiment of the present invention.
Figure 6:
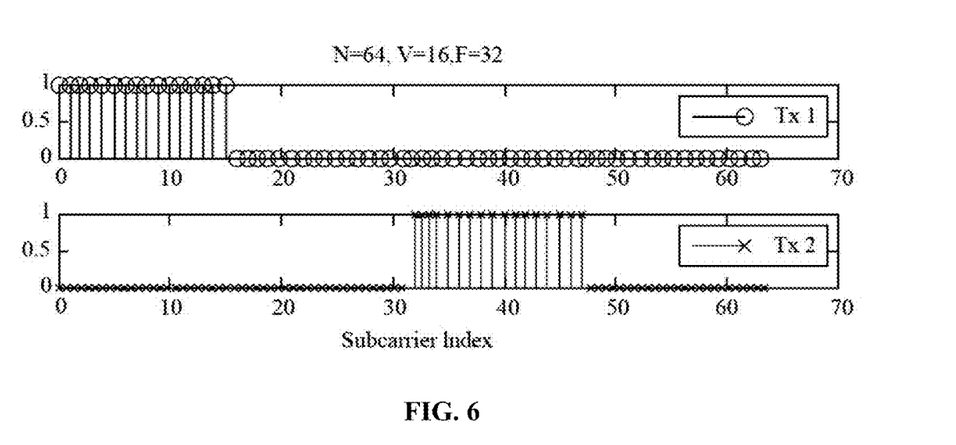
Figure 7:
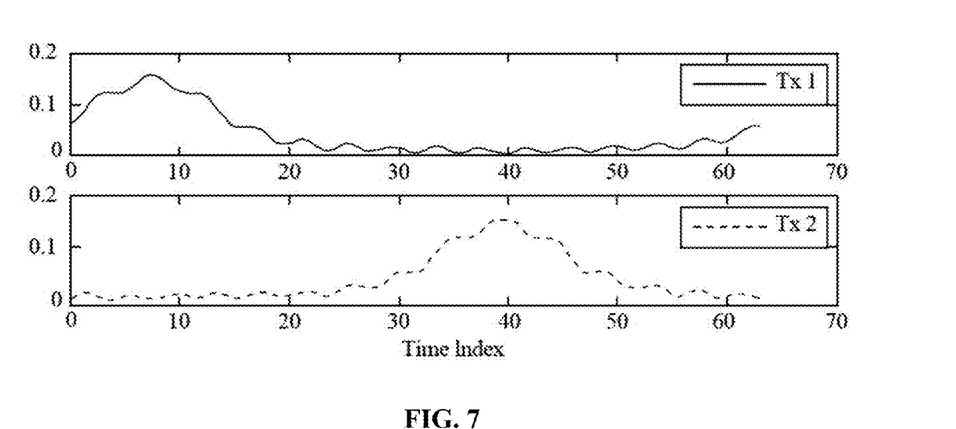

With reference to FIG. 5 for a schematic view of a cooperative MIMO system based on a partial Zadoff-Chu sequence in accordance with the third preferred embodiment of the present invention, when the value of β is increased, the training signals will be more concentrated in the time domain. FIG. 5 obviously shows that the complete Zadoff-Chu sequence (β=1) has signals uniformly distributed in the time domain. If β=2, the signals of the partial Zadoff-Chu sequence are more concentrated on the time domain. If β=6, the signal of the partial Zadoff-Chu sequence in the time domain are even more concentrated. Therefore, the method of the present invention can effectively separate the training signals in the time domain to improve the synchronization performance of the receiver. Obviously, as β increases, the corresponding time-domain training signal becomes more concentrated. Wherein, V is the length of the exclusive subband, and N is the fast Fourier transform (FFT) size. Based on the above observations, the present invention is explained by a special case of two cooperating nodes as shown in FIGS. 6 and 7 In general, the frequency-domain training sequence of the m-th relay, $S_m(k)$, is defined as:

$$S_m(k) = \begin{cases} Z_\beta(k - (m-1)V)e^{\frac{-j2\pi k(m-1)F}{N}} & k \in I_m, \quad m = 1, \ldots, N_T \\ 0 & \text{elsewhere} \end{cases} \quad (1)$$

where $$I_m = \{k + (m-1)V \mid k = 0, 1, \ldots, V-1\}$$

In other words, a partial Zadoff-Chu sequence with some phase rotations is carried by an exclusive subband of adjacent subcarriers indicated by the set $I_m$. Accordingly, the corresponding time-domain training signal of the m-th cooperating node can be obtained via applying N-point inverse FFT to $S_m(k)$ as:

$$s_m(n) = \frac{1}{\sqrt{N}} \sum_{k \in I_m} S_m(k) e^{\frac{j2\pi kn}{N}}, \, n = 0, 1, \ldots, N-1$$

Note that the parameter F in equation (1) corresponds to the cyclically shifted amount between $S_m(n)$ and $S_{m+1}(n)$ in time domain. To ensure that the training signals are well separated in time domain as observed in FIG. 6, the cyclically shifted amount F should be larger than the maximum differential propagation delay ($\Delta\tau_{max}$) plus the maximum channel delay spread (L−1) and the width of the time-domain signal's main lobe (P), i.e., $F > P + \Delta\tau_{max} + (L-1)$.

Figure 8:
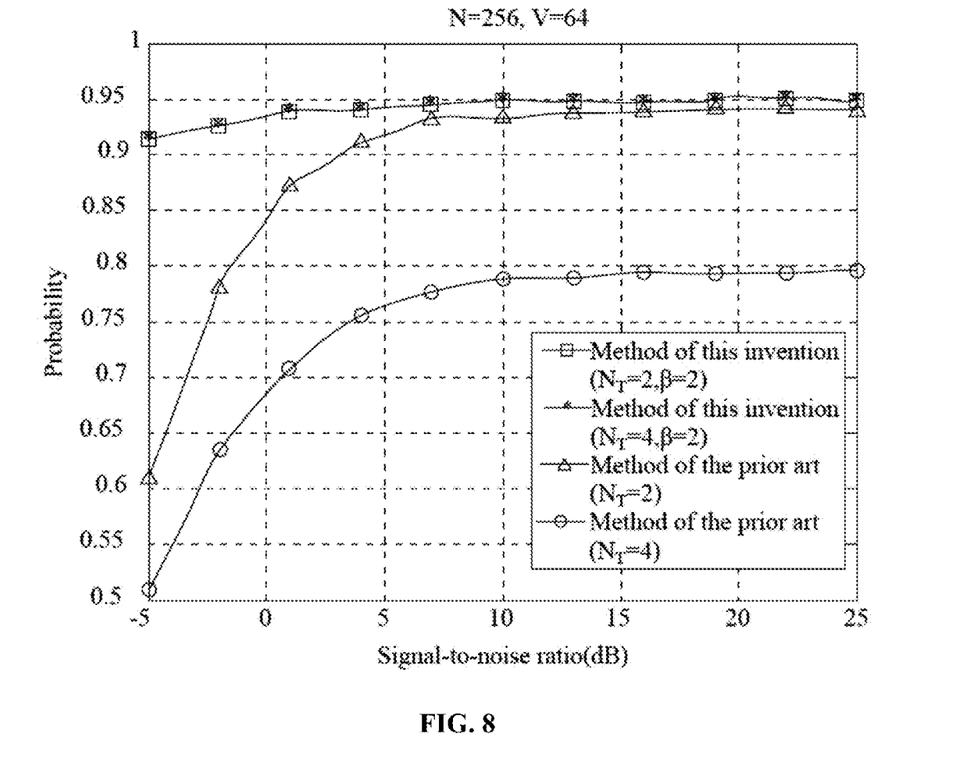
FIGS. 8 to 10 are graphs showing simulation results of a cooperative MIMO system based on a partial Zadoff-Chu sequence in accordance with a preferred embodiment of the present invention.

With reference to FIG. 8 is a graph showing simulation results of a cooperative MIMO system based on a partial Zadoff-Chu sequence in accordance with a preferred embodiment of the present invention, the method in accordance with this preferred embodiment of the present invention based on the probability of successful synchronization is compared with the "novel timing synchronization method for distributed MIMO-OFDM system," disclosed by F. Guo, D. Li, H. Yang, and L. Cai in Proc. 2006 IEEE Veh. Technol. Conf.—Spring (VTC 2006-Spring), vol. 4, Melbourne, Australia, May 2006, pp. 1933-1936, the method of the present invention has a better performance over the conventional UPSP-based method, particularly when the quantity of the cooperative transmitters ($N_T$) is increased or the signal-to-noise ratio is lower. Since the method of the present invention can separate the training signals of the transmitters from one another in the time domain and the frequency domain, therefore the mutual interference can be minimized. On the other hand, the training signals of the transmitters of the conventional UPSP-based method are mixed in the time domain and the frequency domain, so that the mutual interference among the training signals is more severe, and the synchronization performance is reduced significantly, if more cooperative nodes are added.

Figure 9:
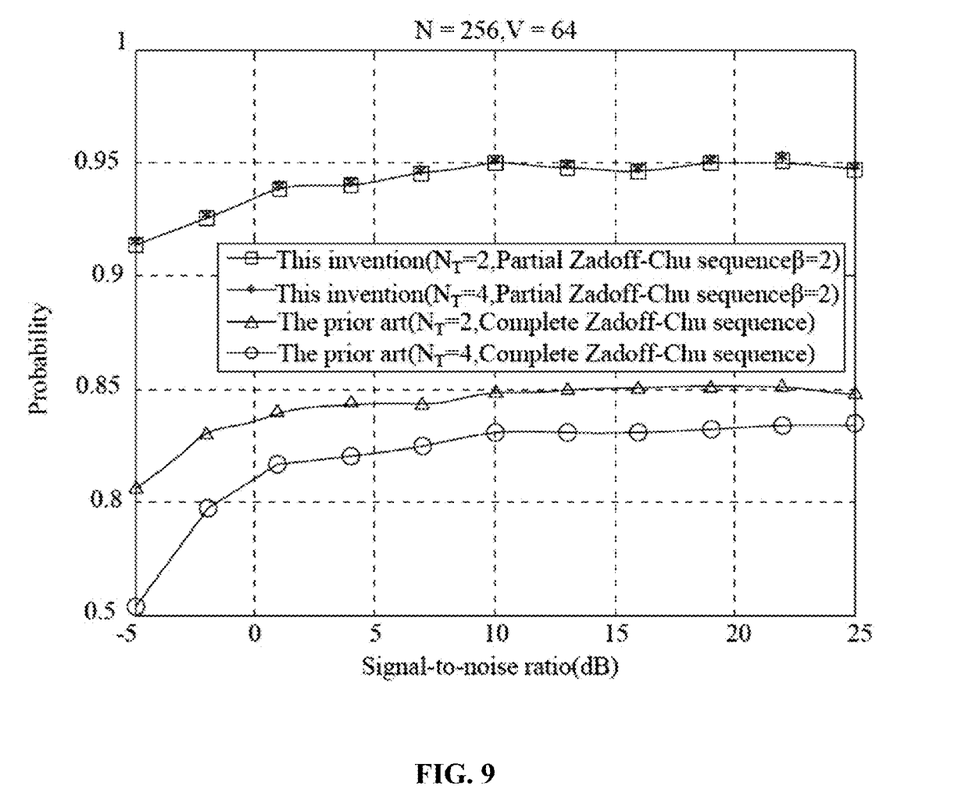

With reference to FIG. 9 for a graph showing simulation results of a cooperative MIMO system based on a partial Zadoff-Chu sequence in accordance with a preferred embodiment of the present invention, the method in accordance with this preferred embodiment of the invention is compared with the "Synchronization for cooperative spatial multiplexing MIMO-OFDM systems in multipath fading environments," by H. Ni, G. Ren, and Y. Chang, in Proc. 2008 IEEE International Conference on Communication Systems (ICCS 2008), Guangzhou, Singapore, Nov. 2008. This conventional method uses the subband-based training signals of a complete Zadoff-Chu sequence. Wherein, V is the length of the exclusive subband, N is a fast Fourier transform (FFT) size and $N_T$ is the quantity of the transmitters, and β is a natural number greater than 1.

Since the present invention adopts a partial Zadoff-Chu sequence, therefore the training signals are separated properly with one another in the time domain and the frequency domain. Compared with the prior art, the synchronization method of the present invention can improve the performance significantly as shown in FIG. 7. Although the conventional method can use the subband-based training signal perform the operation of multi-CFO estimation, yet it also requires an additional FFT operation to convert the received signal into the frequency domain signal, and thus increases the computational complexity.

Figure 10:
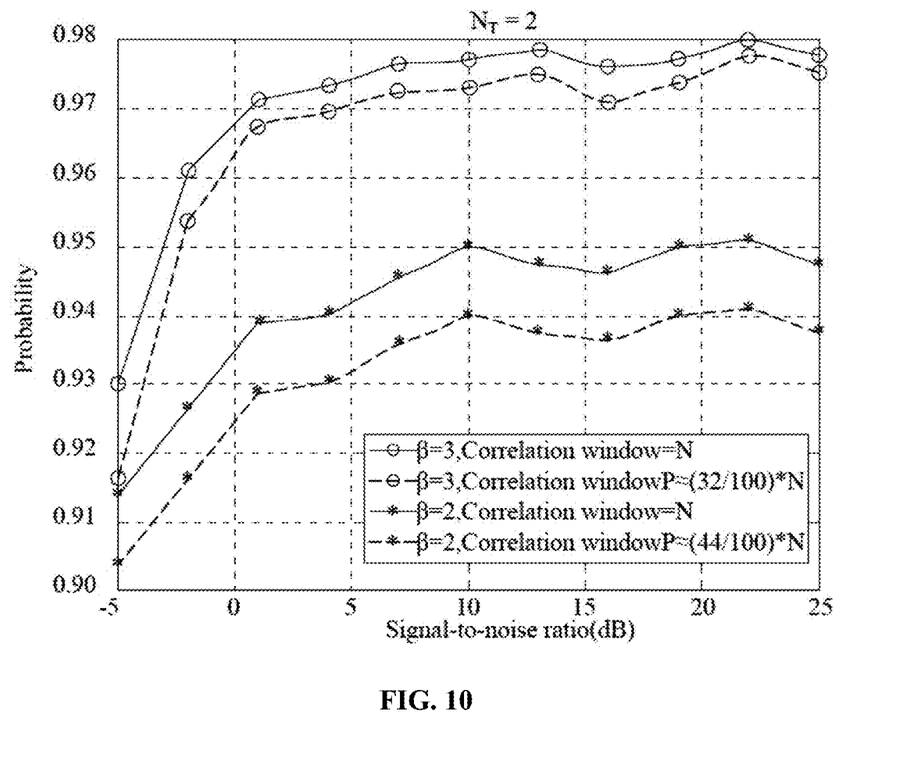

With reference to FIG. 10 for a graph showing simulation results of a cooperative MIMO system based on a partial Zadoff-Chu sequence in accordance with a preferred embodiment of the present invention, this preferred embodiment illustrates the performance that the method of the present invention can achieve under the conditions of different values of β. A larger value of β in the time domain can produce a more concentrated waveform or a better separating effect and a lower mutual interference, so as to achieve a better synchronization performance. With an appropriate selected value of β, the method of the present invention can be applied in different applications to achieve the best performance. On the other hand, if the value of β increases, a correlation window (such as the aforementioned correlation window) smaller than the original correlation window can be used, so $$P = \lfloor 2\sqrt{2\pi/(\beta V)} N \rfloor$$

that the computational complexity can be reduced significantly.

Even though the concept of the synchronization method of the cooperative MIMO system based on a partial Zadoff-Chu sequence in accordance with the present invention has been described in the section of the cooperative MIMO system of the present invention already, the following flow chart is provided for illustrating the invention more clearly.

Figure 11:
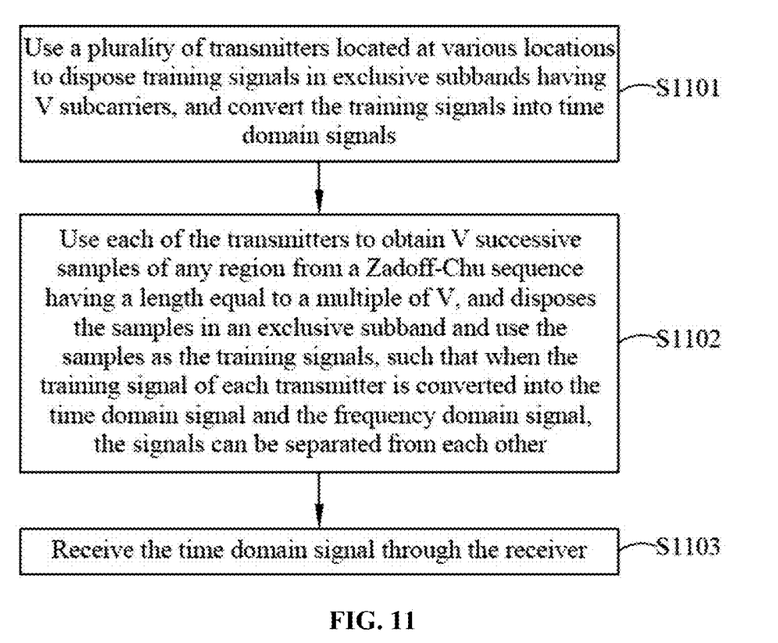
FIG. 11 is a flow chart of a synchronization method of a cooperative MIMO system based on a partial Zadoff-Chu sequence in accordance the present invention.

With reference to FIG. 11 for a flow chart of a synchronization method of a cooperative MIMO system in accordance with the present invention, the method comprises the following steps.

S1101: Use a plurality of transmitters located at various locations to dispose training signals in exclusive subbands having V subcarriers, and convert the training signals into time domain signals.

S1102: Use each of the transmitters to obtain V successive samples of any region from a Zadoff-Chu sequence having a length equal to a multiple of V, and disposes the samples in an exclusive subband and use the samples as the training signals, such that when the training signal of each transmitter is converted into the time domain signal and the frequency domain signal, the signals can be separated from each other.

S1103: Receive the time domain signal through the receiver.

In summation of the description above, the cooperative MIMO system based on a partial Zadoff-Chu sequence and the synchronization method in accordance with the present invention requires no band-pass filter, and thus can lower the cost of the system significantly. The cooperative MIMO system based on a partial Zadoff-Chu sequence and the synchronization method thereof in accordance with the present invention can effectively separate the time-domain training signals and the frequency-domain training signals, and thus can improve the synchronization performance of the system significantly.

The cooperative MIMO system based on a partial Zadoff-Chu sequence and the synchronization method thereof in accordance with the present invention can estimate and compensate multiple carrier frequency offsets, and reduce the computational complexity of the system significantly by a special design of the correlation window.

In summation of the description above, the present invention breaks through the prior, achieves the expected effects, and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A cooperative multiple-input multiple-output system based on a partial Zadoff-Chu sequence, comprising:
   a plurality of transmitters located at various locations, exclusive subband to dispose the partial Zadoff-Chu sequence as training signals Z(k) in frequency domain, and converting the training signals Z(k) into time domain signals; and
   a receiver, arranged for receiving the time domain signals;
   wherein, each transmitter obtains V consecutive samples of any region from a complete Zadoff-Chu sequence having a length equal to a multiple of V and disposes the samples in the exclusive subband and uses the samples as the training signals Z(k), such that when the training signals Z(k) of each transmitter is converted into the time domain signal and a frequency domain signal, the signals are able to be separated from each other to reduce mutual interference at the receiver to enhance the performance of system synchronization;
   wherein, V is a length of the exclusive subband in frequency domain; and
   wherein, the partial Zadoff-Chu sequence comprises a portion of consecutive samples of the complete Zadoff-Chu sequence.

2. The cooperative multiple-input multiple-output system based on a partial Zadoff-Chu sequence as recited in claim 1, wherein each transmitter uses the complete Zadoff-Chu sequence having the length equal to a multiple of V to have first V samples disposed in the exclusive subband and to use the samples as the training signals Z(k).

3. The cooperative multiple-input multiple-output system based on a partial Zadoff-Chu sequence as recited in claim 2, wherein the training signals Z(k) satisfy the following relation:

$$Z(k) = e^{-j\frac{\pi k^2}{\beta V}}$$

wherein, k=0,1,...,V−1, β is a natural number greater than 1, and V is the length of the exclusive subband in frequency domain.

4. The cooperative multiple-input multiple-output system based on a partial Zadoff-Chu sequence as recited in claim 3, wherein a correlation window P is utilized to estimate and compensate multiple carrier frequency offsets (CFOs) as well as to reduce computational complexity, and the correlation window P satisfies the relation of:

$$P = \lfloor 2\sqrt{2\pi/(\beta V)} N \rfloor$$

wherein, β is a natural number greater than 1, V is the length of the exclusive subband in frequency domain, N is the fast Fourier transform (ITT) size.

5. The cooperative multiple-input multiple-output system based on a partial Zadoff-Chu sequence as recited in claim 2, wherein the training signals Z(k) satisfy the following relation:

$$Z(k) = \begin{cases} e^{\frac{-jM\pi k^2}{N}}, & N \text{ is even} \\ e^{\frac{-jM\pi k(k+1)}{N}}, & N \text{ is odd} \end{cases}$$

$$k = v, v+1, \ldots, v+V-1$$

$$v \in [0, N-V]$$

wherein, M is an integer relatively prime to N, V is the length of the exclusive subband in frequency domain, and N is larger than V.

6. A synchronization method of a cooperative multiple-input multiple-output system, comprising the steps of:
using a plurality of transmitters located at various locations to dispose training signals in Z(k) exclusive subband having a length equal to V, and to convert the training signals Z(k) into time-domain signals;
using each of the transmitters to obtain V consecutive samples of any region from a complete Zadoff-Chu sequence having a length equal to a multiple of V, and disposing the samples in the exclusive subband and using the samples as the training signals Z(k), such that when the training signals Z(k) of each transmitter are converted into the time domain signal and a frequency domain signal, the signals are able to be separated; and
receiving the time domain signal through a receiver;
wherein, V is the length of the exclusive subband in frequency domain; and
wherein the partial Zadoff-Chu sequence comprises a portion of consecutive samples of the complete Zadoff-Chu sequence.

7. The synchronization method of a cooperative multiple-input multiple-output system as recited in claim 6, wherein each transmitter uses the complete Zadoff-Chu sequence having the length equal to a multiple of V, and disposes the first V samples in the exclusive subband and uses the samples as the training signals Z(k).

8. The synchronization method of a cooperative multiple-input multiple-output system as recited in claim 7, wherein the training signals Z(k) satisfy the relation of:

$$Z(k) = e^{-j\frac{\pi k^2}{\beta V}}$$

wherein, k=0,1,...,V−1, β is a natural number greater than 1, k is a subcarrier index, and V is the length of the exclusive subband in frequency domain.

9. The synchronization method of a cooperative multiple-input multiple-output system as recited in claim 8, wherein a correlation window P is utilized to compensate multiple carrier frequency offsets and to reduce computational complexity, and the correlation window P satisfies a relation of:

$$P = \lfloor 2\sqrt{2\pi/(\beta V)}N \rfloor$$

wherein, β is a natural number greater than 1, V is the length of the exclusive subband in frequency domain, and N is the fast Fourier transform (FFT) size.

10. The synchronization method of a cooperative multiple-input multiple-output system as recited in claim 7, wherein the training signals Z(k) satisfy the following relation:

$$Z(k) = \begin{cases} e^{\frac{-jM\pi k^2}{N}}, & N \text{ is even} \\ e^{\frac{-jM\pi k(k+1)}{N}}, & N \text{ is odd} \end{cases}$$

$$k = v, v+1, \ldots, v+V-1$$

$$v \in [0, N-V]$$

wherein, M is an integer relatively prime to N, V is the length of the exclusive subband in frequency domain, and N is larger than V.

* * * * *